United States Patent [19]

Ojima

[11] Patent Number: 4,776,265
[45] Date of Patent: Oct. 11, 1988

[54] METHOD OF AND APPARATUS FOR MAKING BREAD

[76] Inventor: Shin Ojima, 1116-32, O-aza Hattorigawa, Yao-city, Osaka, Japan

[21] Appl. No.: 98,448

[22] Filed: Sep. 18, 1987

Related U.S. Application Data

[62] Division of Ser. No. 912,478, Sep. 29, 1986.

[30] Foreign Application Priority Data

| Oct. 12, 1985 | [JP] | Japan | 60-227235 |
| Oct. 12, 1985 | [JP] | Japan | 60-155972 |
| Nov. 19, 1985 | [JP] | Japan | 60-177835 |
| Dec. 5, 1985 | [JP] | Japan | 60-273629 |
| Apr. 15, 1986 | [JP] | Japan | 61-56477 |
| Aug. 19, 1986 | [JP] | Japan | 61-193761 |

[51] Int. Cl.$^4$ .................................................. A47J 27/00
[52] U.S. Cl. ............................................. 99/348; 99/468
[58] Field of Search ............... 99/348, 468, 470, 473, 99/474, 475, 476, 483, 484; 426/27

[56] References Cited

U.S. PATENT DOCUMENTS

| 3,884,213 | 5/1975 | Smith | 99/348 |
| 4,538,509 | 9/1985 | Ojima | 99/348 |

Primary Examiner—Robert W. Jenkins
Attorney, Agent, or Firm—Armstrong, Nikaido, Marmelstein & Kubovcik

[57] ABSTRACT

A method and apparatus for making bread wherein the duration of kneading is set at a predetermined value, and the kneading stage is divided into (1) an early kneading stage wherein either cool or warm air is blown onto the dough at the start of kneading to bring the dough temperature, within a short time period, close to the optimum kneading temperature and (2) a later kneading stage wherein cool air and warm air are blown onto the dough in an alternating mode in order to maintain the dough temperature close to the optimum kneading temperature.

10 Claims, 13 Drawing Sheets

(a)

(b)

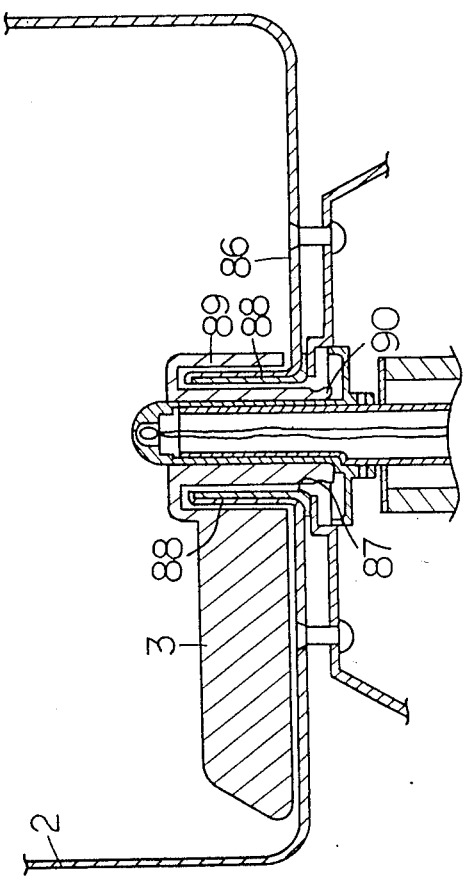

METHOD OF AND APPARATUS FOR MAKING BREAD

This is a division of application Ser. No. 912,478 filed Sept. 29, 1986.

BACKGROUND OF THE INVENTION

1. Field of the Invention

This invention relates to a method of and an apparatus for making bread at home and, in particular, to a method of and an apparatus for making bread by which anybody can make flavorful bread through all seasons regardless of their knowledge of baking.

2. Description of the Prior Art

Generally, the break making process progresses in such steps that wheat flour, yeast, butter or shortening, sugar, salt, dry milk, and water as materials each in an appropriate quantity are prepared, kneaded in a vessel, subjected to the primary fermentation, degassed, subjected to the secondary fermentation to be optionally performed, degassed again, subjected to shaping-fermentation after the lapse of a waiting time (bench time), and baked into bread. The above process takes 3 to 4 hours and has hitherto solely depended on the manual operation, whereby home-baking has been followed by a problem that a housewife familiar with baking is obliged to be attentive thereto for 3 to 4 hours continuously and prevented from getting on with other houseworks. For solving such problems, the applicant of this invention filed a patent application for "automatic breakmaking apparatus" (Date of Application: June 28, 1984), and was granted a patent right as the U.S. Pat. No. 4,538,509. This "automatic breakmaking apparatus" was composed of: a material (-containing) vessel for containing bread materials; water supply means for supplying water for the material vessel; kneading means for kneading the dough disposed in the material vessel; a heater for baking the kneaded dough; a temperature sensor for sensing temperature variation in the dough under kneading; and a control part for controlling abovesaid several means and devices on the basis of information obtained from the temperature sensor, wherein the process progressing from kneading of dough to baking was automatically performed except feeding of bread materials each in a fixed quantity into the material vessel in the beginning and subsequent switching-on of the power source.

It is known that an important point in bread making is temperature control for the dough during kneading. The temperature of the dough when kneading is completed is preferably set to be approximate to the temperature at which gluten reaches the optimum level of glutinousness (which will be called "optimum kneading temperature" hereinafter). It is also known that the optimum kneading temperature for, for example, English bread ranges from about 27° to 30° C., and, therefore, the temperature of mixed materials of English bread before kneading is preferably set slightly lower than 27° C. in consideration of the temperature rise caused in the material mixture by frictional heat during kneading.

As described above, in the case of English bread, gluten is in the best glutinous condition at a temperature between 27° and 30° C., not above or below, and various ideas, such as pouring of cold water into the material mixture in the summer in view of high atmospheric temperature or warm water in cold winter, have hitherto been employed for adapting the dough temperature at the end of kneading to be approximate to the optimum degree.

In the "automatic break-making apparatus" for which the inventor of this invention filed a patent application, too, the above method is adopted and water of normal temperature is poured into the material mixture in the spring and autum whereas cold water of about 5° C. is used in the summer and warm water in the winter so that a temperature of the material mixture before the start of kneading may be set at 20° to 22° C. through all seasons. Practically, it is common to start kneading when the temperature of the material mixture is found reaching a level between 20° and 22° C. as a result of continuous monitoring of temperature by means of a temperature sensor disposed in an appropriate position in the material vessel. With the start of kneading, the temperature of the material mixture starts rising gradually due to the generation of frictional heat herein. Kneading is usually stopped at the supposed standard time when the rising temperature reaches a level between 27° and 30° C. at which the glutinousness of gluten becomes optimum.

Another method of lowering the temperature of the material mixture at the start of kneading in place of the use of cold water has also been disclosed, wherein a blower to blow air to the material mixture is provided in a suitable position in the oven so as to deprive the material of evaporation heat and thereby lower the temperature thereof.

By the method devised as above, the dough temperature at the time of completion of kneading can always be approximated to a degree between 27° and 30° C. at which yield of gluten of the highest quality is expectable and loaves of bread are soft and rich in flavor.

However, when having closely examined bread baked by this apparatus, it has been found that the bread quality is maintained at a certain level but varies in stiffness according to the atmospheric temperature in the day on which bread is baked even in the same season and also varies subtly in flavor. The applicant probed the causes of such differences and have found that the problem is attributable to the length of time of kneading. In other words, even in the same season, the atmospheric temperature differs according to the day and influences the speed of temperature rise in the dough which is caused by frictional heat during kneading, whereby a difference arises in the length of time of kneading even when the temperature rises by the same degree. Thus, even if the dough temperature is strictly controlled at the start and the end of kneading, the length of time of kneading varies as far as timing of the finish of kneading is set on the basis of the dough temperature only. Such relationship as above has been found to cause a difference in the ripening degree of gluten and to influence fermentation of the dough, resulting in subtle effects on stiffness and flavor of baked bread.

BRIEF SUMMARY OF THE INVENTION

This invention was initiated for solving such problems as above.

The primary object of this invention is to disclose a method of obtaining flavorful bread anytime at home through the four seasons.

Another object of this invention is to provide a breadmaking apparatus which is based on fully automatic process progressing from kneading to baking except for the feeding of bread materials by hand, and is capable of making flavorful bread of uniform quality regardless of the season.

To attain these objects, an apparatus according to this invention is provided with blowing means allowing appropriate changeover between warm air and cool air to be blown, wherein the kneading process is divided into two stages so that the dough temperature may be controlled by suitable blowing of warm air or cool air onto the dough in each stage. That is to say, warm air or cool air selected according to the temperature of the bread material mixture before kneading is blown thereonto in the early kneading stage and, immediately after the start of kneading, the dough is subjected to quick raising or lowering of temperature so as to have a temperature approximately equal to the optimum kneading temperature. In the subsequent later stage, the degree of dough temperature is prevented from widely fluctuating and is kept stable until the finish of kneading by suitable changeover between warm air and cool air which is blown onto the dough. In this way, a time period of kneading can be set regardless of the atmospheric temperature at a constant value suitable for the material mixtures. A bread-making apparatus embodying the above method is characterized by being provided with a heater-equipped blower capable of suitable changeover between blowing warm air and cool air, a temperature sensor to sense information about temperature for controlling the aforesaid blower, and, further, a yeast pouring device to pour yeast into the material mixture automatically depending on instructions from the temperature sensor for providing the optimum timing of yeast pouring when required.

For avoiding confusion in understanding the description hereinafter, the terms "bread material" and "dough" are defined as follows. The former applies to wheat flour, yeast, shortening, sugar, salt, and dry milk including those materials which have been subjected to addition of water but are not yet mixed and kneaded with each other. The latter applies to a mixture of the abovesaid materials mixed and kneaded together, even if slightly, in which component materials are inseparable from each other.

DETAILED DESCRIPTION OF PREFERRED EMBODIMENTS

Figure 1:
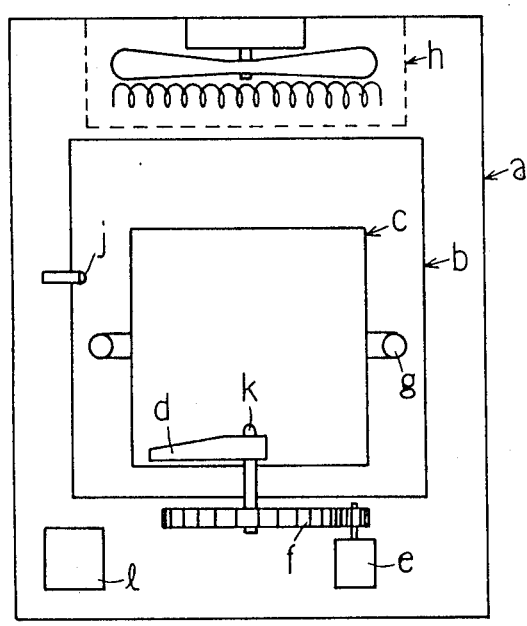
FIG. 1 is a view of a fundamental structure of a bread-making apparatus according to this invention.

FIG. 1 is a view showing a fundamental structure for making bread by a method according to this invention, in which the reference character a indicates a main body vessel of a bread-making apparatus; b, an oven, c, a material vessel for receiving bread materials; d, a rotary vane for kneading bread materials fixed to the bottom of the material vessel; e, a driving source for driving a motor to rotate the abovesaid rotary vane, the driving power of the motor e being transmitted to the rotary vane d through transmission means f. g represents a heater for the oven (oven heater) for baking the dough contained in the material vessel, which is disposed around the outer periphery of the material vessel c at a certain distance therefrom in the form of a ring, and h indicates a heater-equipped blower capable of suitable changeover between blowing warm air and cool air. j denotes a first temperature-sensor fixed to the inner wall of the oven for monitoring the temperature therein, k indicating a second temperature-sensor fixed to the tip of central shaft of the rotary vane d for monitoring the dough temperature, which monitors not only variations in temperature of the dough under kneading but also the temperature of bread at the finish of baking. l stands for a control part for controlling performance of respective groups of the abovesaid devices.

For bread making by the use of an apparatus of such a structure as above, the following steps are taken. Though a description is made for English bread, the steps are entirely equally applicable to the other kinds of bread, except that the optimum kneading temperature is to be set somewhat differently from that for English bread.

First, dry yeast wrapped with a wafer or the like is placed on the bottom of the material vessel c, bread materials such as wheat flour and butter, each in a predetermined quantity, are fed thereinto as the second step, and thirdly, water is added thereto. In this invention, the dough temperature is adjusted after the start of kneading by blow of warm air and cool air so quickly that water of the normal temperature may be added to bread materials even in summer or winter. Accordingly, cooling and heating of water or means therefor are not required.

Upon finish of feeding of bread materials, the process proceeds to kneading and the dough temperature immediately after the start of kneading ranges from 0° to 35° C. according to the season. Such temperature difference in the dough is comparatively trivial in summer but becomes a problem when the weather is cold as in winter. In other words, when the dough is heated by the oven heater alone, it is difficult to raise the dough temperature to the optimum kneading temperature ranging from 27° to 30° C. for English bread during kneading. The fact that the temperature of the bread material mixture is significantly low at the start of kneading as compared with the optimum kneading temperature is indicative of uncertainty in the rate of temperature rise during kneading, and is a cause of the problem that a fixed length of time of kneading leads to an uncertain temperature at the finish of kneading, whereas a fixed temperature at the finish of kneading leads to an uncertain length of kneading time, thereby resulting in excessive or insufficient ripening of gluten. At worst, caused are such problems that the dough temperature never reaches a desired degree no matter how long the kneading time is, and gluten of desired quality cannot be obtained during a lapse of desired time or the kneading operation endlessly lasts if the time of finish of kneading is set dependently on the dough temperature. To cope with these problems, in this invention, a heater-equipped blower h capable of suitable changeover between blowing warm air and cool air is employed and the kneading process is divided into two stages, an early one and later one, in which the performance mode of the heater-equipped blower in the early stage is adapted to be different from that in the later stage. That is, in the early stage, when the temperature of the material mixture before kneading is, for example, lower than the optimum kneading temperature, the heater-equipped blower h is suitably actuated to blow warm air toward the dough in addition to heating by means of an oven heater g so as to quickly raise the dough temperature.

When the temperature of the material mixture before kneading is higher than the optimum kneading temperature, the fan of the heater-equipped blower is driven for blowing cool air to the dough and lowering the dough temperature close to the optimum kneading temperature.

Then, in the subsequent later stage of kneading, the dough is subjected to warm air and cool air blown and suitably changed over by the heater-equipped blower h intermittently driven so that the dough temperature may constantly be almost equal to the optimum kneading temperature until the completion of kneading.

Changeover between warm air and cool air is performed through a control part 1 on the basis of the dough temperature sensed by the temperature sensor k.

Even when the temperature of the material mixture at the start of kneading is significantly lower than the optimum kneading temperature, the above structure to work in such manner as above enables quick raising of the dough temperature to the desired degree in a short period of time after the start of kneading, whereby almost part of kneading process can be performed at the optimum kneading temperature and a sufficient length of time for producing gluten of the highest quality can be ensured.

After the bread materials are fully kneaded and a glutinous dough is obtained, the process proceeds to baking of bread to be performed in the same vessel as used for kneading. Control over baking has hitherto depended on the time factor alone but, according to this invention, the 2nd temperature sensor k inserted into the dough senses the internal temperature of the bread for finding a state of bread under baking. In this way, an internally well-baked loaf of bread in the optimum condition can be obtained irrespective of fluctuation in voltage of the power source and difference in quantity between material mixtures.

In the case of bread materials prepared one day at an extremely low atmospheric temperature as in winter and baked on the next norning with the aid of a timer switch, it is feared that these materials are cooled and freeze before the start of kneading. In this case, with the oven heater g appropriately powered up until the start of kneading, the bread materials are kept warm and prevented from freezing.

In the abovesaid process, yeast is poured simultaneously with feeding of bread materials before the start of kneading, however, preferably at the time when the dough temperature reaches a certain specified degree, and therefore, it is desirable to provide a yeast pouring device which performs automatic pouring of yeast when a specified dough temperature is obtained.

With reference to the drawings, embodiments of this invention will be described hereinafter.

Figure 2:
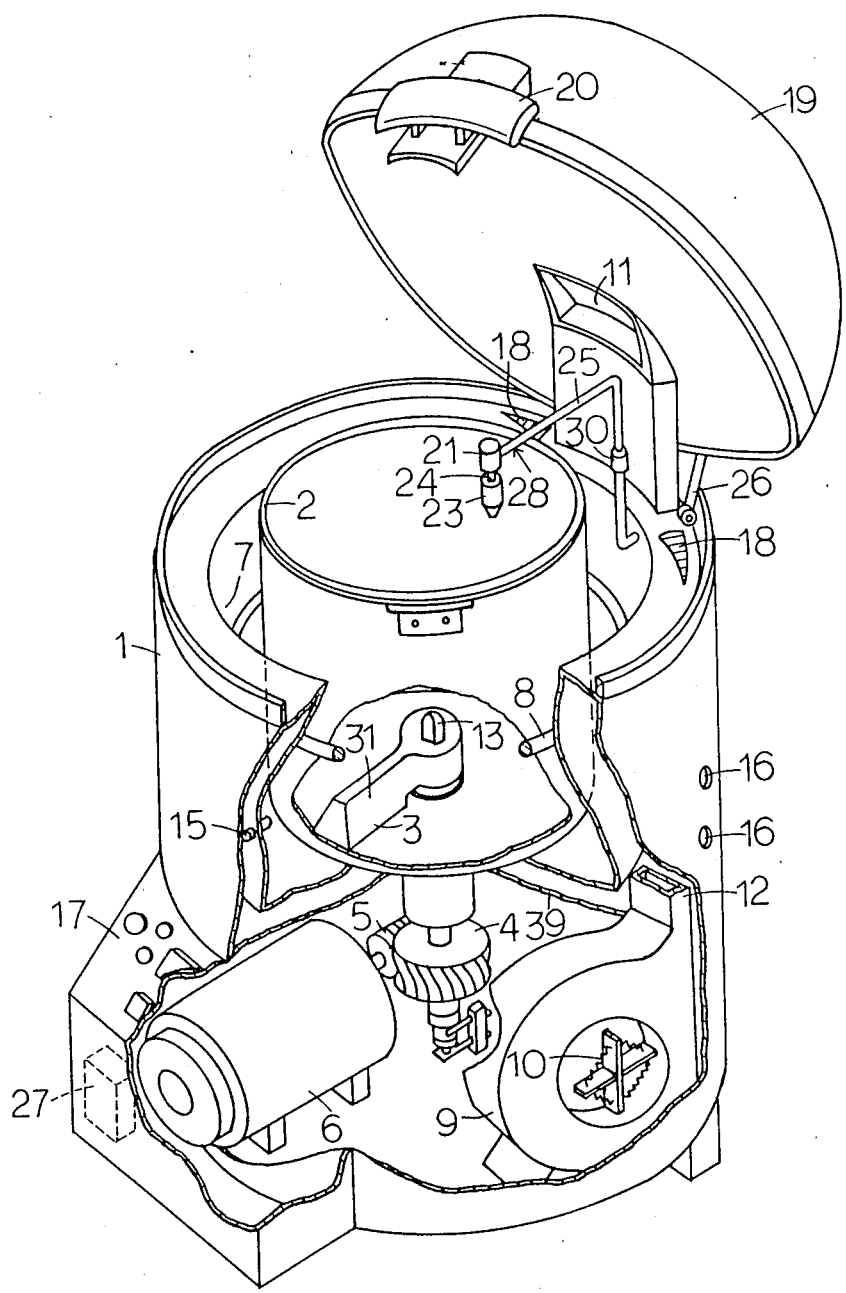
FIG. 2 is a perspective view of the outline of a bread-making apparatus as an embodiment of this invention with a part of the mechanism thereof omitted.
Figure 3:
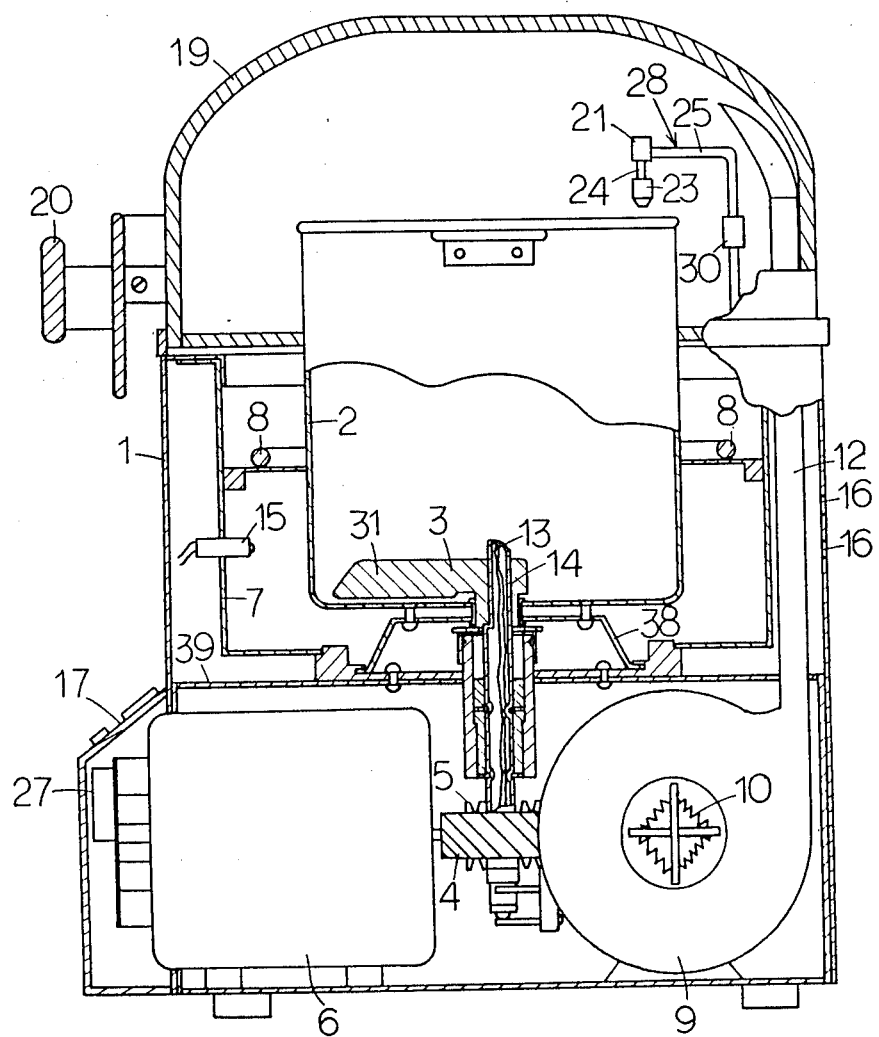
FIG. 3 is a partial view showing the vertical section of the structure of the embodiment.

FIGS. 2 and 3 are views of a bread-making apparatus according to this invention. When externally viewed, this apparatus is composed of a roughly cylindrical bottomed main body vessel 1 and a cup-like lid 19 provided with a handle 20 for opening and closing the lid at the front and connected to the main body vessel 1 with a hinge 26. The main body vessel 1 is internally provided doubly with a roughly cylindrical oven 7 and a material vessel 2 whose inner wall is coated with fluoric resin excellent in mold-releasability such as tetrafluoroethylene, and a gap to be closed at the top is provided between the main body vessel 1 and the oven 7 as well as another gap between the oven 7 and the material vessel 2. A temperature sensor 15 for monitoring the temperature in the oven 7 is fixed to the side wall of the oven 7. A rotary vane 3 is detachably fitted on the revolving shaft 14 and a worm wheel 4 is fixed to the lower part of the revolving shaft 14 so as to mesh with a worm 5 secured to the shaft of a motor 6 for gearing down and transmitting the driving power of the motor 6 to the rotary vane 3. A temperature sensor 13 for constantly monitoring the dough temperature is disposed within the revolving shaft 14 at a point near the tip of the shaft and output of the sensor is introduced to the lower part of the revolving shaft 14 by a lead wire passing through the shaft 14 and then to the outside. A mechanism of output introduction as above, a structure for fixing the rotary vane 3, and the detail of a structure of the revolving shaft 14 will be described later.

The reference numeral 8 indicates a heater for the oven (oven heater) shaped like a ring surrounding the material vessel 2 and serving as a heat source for heating the oven during or before kneading and also for baking. The calorific value of the heater must be sufficiently high for baking bread and, in this embodiment, a heater of about 600 W is employed. Though only a single heater is disposed in the vertical midposition of the material vessel 2 in the embodiment shown in the drawing, two sets of heaters may be disposed separately high and low around the material vessel 2, of course. The numeral 9 denotes a heater-equipped blower which may be of an optional type endowed with a capability of performing changeover between warm air and cool air to be blown for quickly raising or lowering the dough temperature. In the embodiment shown in the drawing, a Sirocco fan incorporating a heater 10 of about 200 W is employed. A duct 12 having a downward-directed blow opening 11 at the upper end thereof is provided between the inner wall of the main body vessel 1 and the outer wall of the oven 7 for guiding warm air or cool air blown from the heater-equipped blower 9 toward the upper part of the main body vessel 1 and for blowing warm air or cool air toward the dough therefrom. The numerals 18 and 18 indicate discharge openings for discharging vapor filling the mainbody vessel 1 toward the outside by blowing. Vapor blown into these discharge openings 18 and 18 passes through a gap between the inner wall of the main body vessel 1 and the outer wall of the oven 7 and is discharged out through a discharge window 16. As described above, the heater-equipped blower 9 is of optional type as far as permitting change-over between warm air and cool air in blowing and may be set in any suitable position. Diversified arrangements will be described later by way of other embodiments.

The numeral 17 stands for an operation panel for inputting data required for controlling the performance of this bread-making apparatus. The panel is composed of a key-arranged part and indication part, and data inputted from the operation panel 17 are transmitted to various devices through a control part 27. The detail of this operation panel 17 will be described later.

A yeast pouring device 28 for pouring yeast into the dough under kneading is fixed to the upper part of the material vessel 2. This yeast pouring device 28 is fixed in consideration of the fact that delicate variation in raise, grain, and flavor occurs according to the timing of pouring of yeast. Such variation is due to the degree of activity of yeast fluctuating according to the thermal environment. In view of this fact, timing of pouring yeast into bread materials is determined on the basis of the dough temperature in the yeast pouring device 28 of this invention. For example, if the temperature at the time of pouring yeast is set at 27° C., the yeast pouring device 28 is operated when the temperature of 27° C. is sensed by the temperature sensor 13 and automatically pours yeast in a suitable quantity into the dough. In this way, it is not necessary to throw dry yeast wrapped in wafer into the material vessel 2 simultaneously with feeding of bread materials and bread can be baked to be raised to a certain constant degree and to have the same flavor regardless of the season.

The yeast pouring device 28 is of a structure in which a cup-like yeast reserving box 21 capable of reserving, for example, yeast 22 (2-4 g) corresponding to 1 lb (450 g) of bread is provided on the upper part of the material vessel 2 and an electromagnetic valve 23 is connected to a pouring pipe 24 of the box 21, the box being fixed to the oven 7 by a support arm 25 having a rotatable part 30 disposed at a suitable midpoint thereof. The electromagnetic valve 23 is controlled by information from the temperature sensor 13 and, when the temperature sensor 13 senses the temperature of, for example 27° C., is opened to scatter yeast contained in the yeast reserving box 21 toward the inside of the material vessel 2. The rotatable part 30 provided in the midpoint of the support arm 25 is intended to prevent the yeast pouring device 28 from intefering with detachment of the material vessel 2 from the main body vessel 1.

Other modes of yeast pouring device 28 are conceivable and will be described later with reference to other embodiments.

Structure for fixing rotary vane and around revolving shaft

Figure 4:
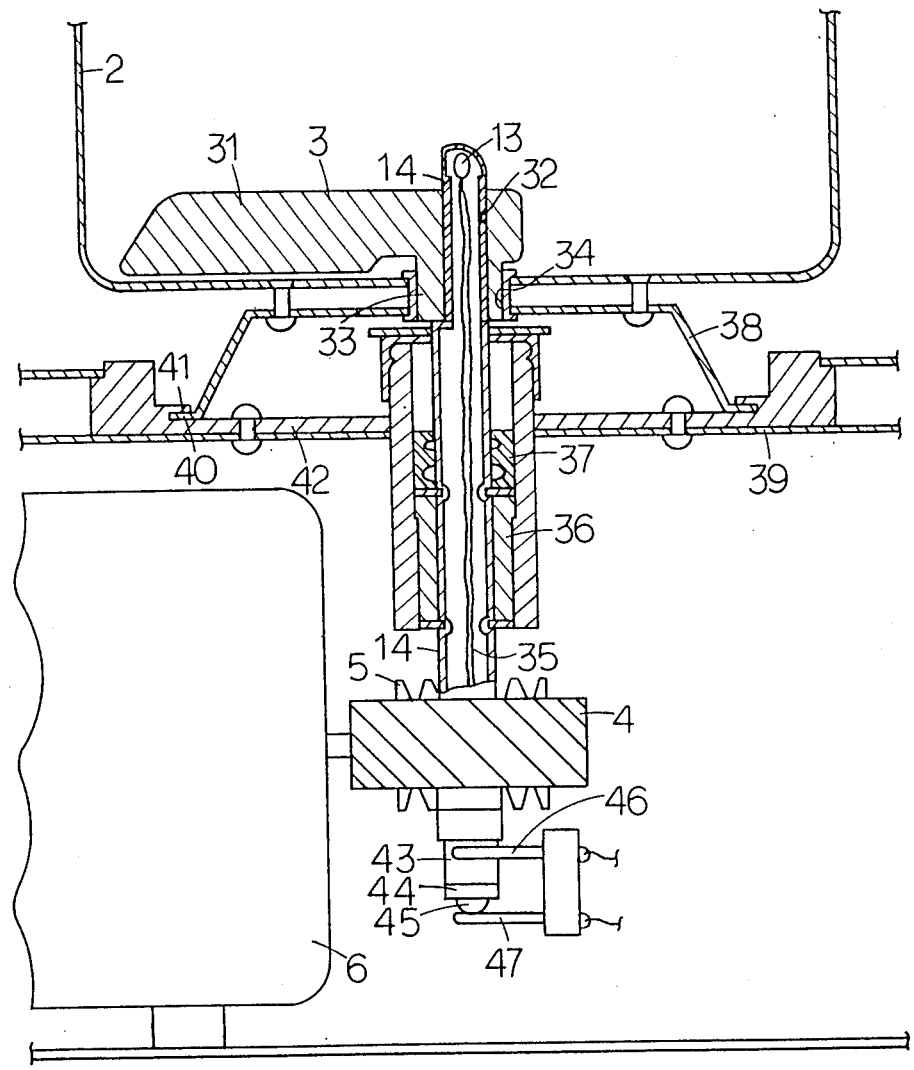
FIG. 4 is a partial view showing the vertical section of a mechanism around a revolving axis of the embodiment.
Figure 5:
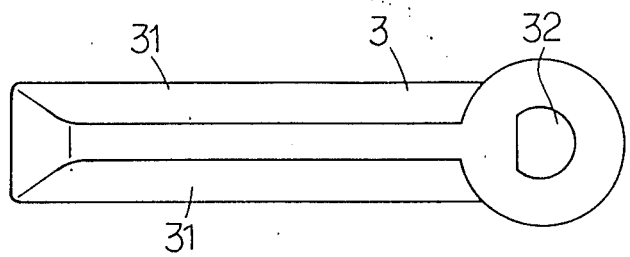
FIG. 5 is a plane view of a rotary vane of the embodiment.

FIG. 4 is a partial view shwoing a vertical section of a structure in which the material vessel 2 is fixed to the main body vessel 1 and a mechanism around the revolving shaft 14, and FIG. 5 is a plane view of the rotary vane 3 fitted onto the revolving shaft 14.

The rotary vane 3 for kneading the material mixture is disposed on the center of the bottom of the material vessel 2, bevelled at faces 31 and 31 for easy kneading, and coated with a material excellently mold-releasable such as tetrafluoroethylene resin. A leg part 33 extends from the lower part of the rotary vane 3 and is inserted into an insertion hole 34 provided on the bottom center of the material vessel 2. A setting hole 32 in the shape of a partially cutaway circle when viewed from above is provided in a position corresponding to the rotation center of the vane 3 and, on the other hand, a certain length of an upper part of the revolving shaft 14 is shaped to agree with the external shape of the setting hole 32. The rotary vane 3 is fitted onto the revolving shaft 14 so that revolutions of the revolving shft 14 may be transmitted to the rotary vane 3 without racing of the shaft 14. The upper part of the revolving shaft 14 onto which the rotary vane 3 is detachably fitted is made of heat-resistant resin. Particularly, the tip of the revolving shaft 14 made of heat-resistant resin and to be brought into direct contact with the dough is reduced in thickness and is internally provided with the temperature sensor 13 for enabling monitoring of the dough temperature. The reason why the upper part of the revolving shaft 14 is made of heat-resistant resin lies in the purpose to prevent heat generated by the oven heater 8 and frictional heat with revolutions of the revolving shaft 14 from being transmitted to the temperature sensor 13 through the metallic revolving shaft 14 as well as to prevent the dough from scorching and sticking to the revolving shaft 14 during kneading. The thickness of the heat-resistant resin is reduced at the tip of the revolving shaft 14 for increasing sensitivity of the temperature sensor 13. Thus, measurement of the dough temperature with high precision by means of the temperature sensor 13 is made possible. The numerals 36 and 37 represent a bearing and oil seal, respectively.

38 indicates a supporting stand fixed to the lower part of the material vessel 2 and 39 represents a plate for partitioning a space into two, one for receiving the oven 7 and material vessel 2 and the other for receiving the motor 6 and driving mechanism for the heater-equipped blower 9, the plate 39 preventing moisture and and bread materials from entering the driving mechanism.

Figure 6:
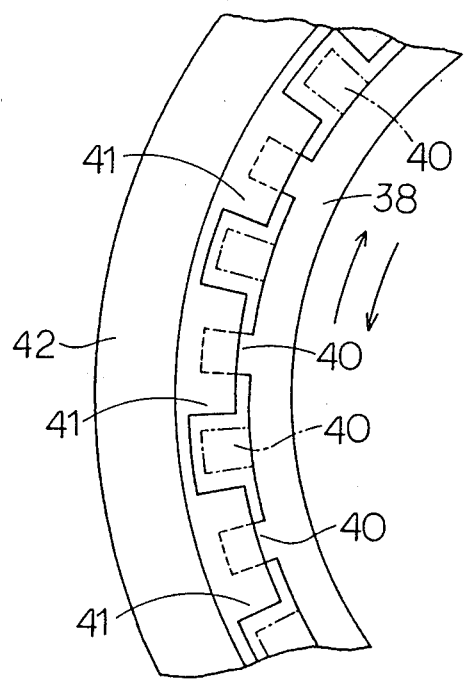
FIG. 6 is a view showing an engagement relation between the support stand and an engaging part of the setting stand of the embodiment.

The supporting stand 38 is provided, as shown in FIG. 6, with outwardly bent edge parts 40 for engagement purpose spaced from each other at equal intervals at the lower end thereof, and, on the other hand, a setting stand 42 having engaging parts 41 each shaped like a channel in crosssection to mesh with the abovesaid edge parts 40 is fixed to the plate 39, whereby the edge parts 40 and engaging parts 41 meshing therewith fix the supporting stand 38 onto the plate 39 for stably supporting the material vessel 2. When taking out a loaf of baked bread, the upper edge of the material vessel 2 is held by hand and turned by a certain degree of angle so that the edge parts 40 may deviate from the engaging parts 41, thereby the material vessel 2 being readily detached from the main body vessel 1.

A worm wheel 4 large in diameter is fixed to a part slightly higher than the lower end of the revolving shaft 14 and meshes with the worm 5 fixed to the shaft of the motor 6 for gearing down and transmitting the driving power of the motor 6 to the revolving shaft 14. A metallic sliding ring 43 is fitted on the lower part of the revolving shaft 14 and, to the further lower part, an insulator 44 having a convex contact 45 protruding from the center thereof is fixed. A lead wire 35 introduced from the temperature sensor 13 internally disposed in the revolving shaft 14 close to the tip thereof is connected to the sliding ring 43 and the convex contact 46 while extending from the inside of the revolving shaft 14, and a slidable contact piece 46 is pressed to the side of the sliding ring 43 whereas another slidable contact piece 47 is pressed to the convex contact 45 from the under-side, whereby output of the temperature sensor 13 is introduced to the outside by these slidable contact pieces 46 and 47.

A worm wheel 4 and worm 5 are used in the embodiment shown in the drawing as driving power transmission means, however, a pulley and belt may be used instead.

Structure of operation panel

Figure 7:
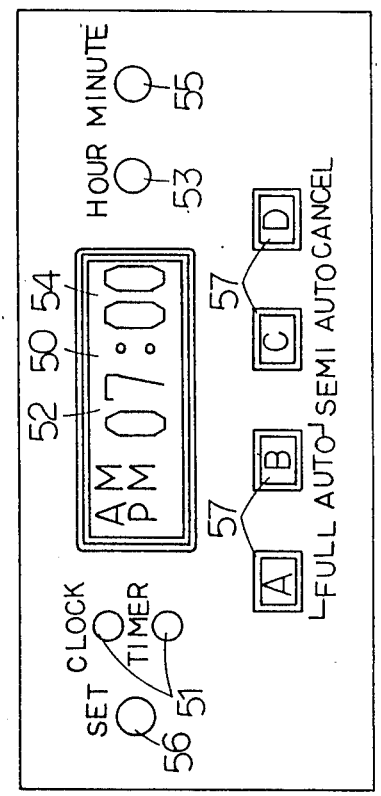
FIG. 7 is a view showing a structure of the operation panel of the embodiment.

As shown in FIG. 7, the operation panel 17 comprises an indication unit and a key-arranged unit. The indication unit is composed of a digital indication part 50 for indicating the time and of time-mode indication parts 51 disposed aside the former part 50. The digital indication part 50 is endowed with a function to indicate the time at present and the scheduled time of completion of kneading whereas the time-mode indication parts 51 is endowed with a function to indicate whether the time indicated by the digital indication part 50 is classified into the mode of the time-at-present or that of the scheduled time of completing kneading. The key-arranged unit is composed of an hour-key 53 for putting forward or backward the time indicated by the hour-indication part 52 of the digital indication part 50 when setting the time, a minute-key 55 for putting forward or backward the time indicated by the minute-indication part 54, a setting key for setting the indicated time and storing it in the memory of the control part 27, and performance-mode keys 57 for selecting the mode of performance of the apparatus. Performance-mode keys 57 are four in number and kind as, for example, A, B, C, and D, among which A corresponds to fully automatic performance for English bread; B to that for French bread; c to semiautomatic performance; and D to cancellation of performance; and, when the key A or B is depressed, except for feeding of bread materials into the material vessel 2 by hand, other subsequent performances, such as kneading→primary fermentation→degassing→waiting time→rounging→shaping fermentation→baking, are all automatic while the the length of time and temperature are controlled so as to be adaptable to English bread or French brad. When C is depressed, performances prior to shaping-fermentation, that is, rounding and other performances precedent thereto are made automatic and subsequent ones are suspended, whereby the dough is taken out from the material vessel 2 by the user of the apparatus, shaped as desired, fermented, and baked by another oven. When D is depressed, mechanical operation is stopped at once in any of performance modes as A, B, and C for preventing trouble in case of mistake such as no feeding of bread materials.

Steps of time setting are as follows: In the normal state, the present time is displayed on the digital indication part 50. When the hour-key 53 and minute-key 55 are depressed in this state, indicated numerals on the digital indication part 50 change and, therefore, by manipulating the hour-key 53 and minute 55, the present time is set. Then, with the setting key 56 depressed, the time-mode is automatically changed over and the scheduled time is indicated on the digital indication part 50. Since the scheduled time, after being indicated for a certain period of time, is automatically changed over and the present time is indicated, the scheduled time is set before being changed over in the same manner as in the case of setting the present time. The scheduled time equals the time at which bread is baked up; if bread is wanted for 7.00 on the next morning, the scheduled time is set at the point of 7.00 on the indicator today.

On the basis of the set scheduled-time, a microcomputer incorporated into the control part 27 performs backward calculation while taking the atmospheric temperature into account and fixes the time to start operating the apparatus. The time of start of operation is not always required to be set so exactly. The reason is that, if the actual time of completion of baking is earlier than scheduled, the quality of baked bread can be maintained at a certain level by suitably blowing cool air onto bread by means of the heater-equipped blower 9. The method in this case will be described later. The present time and the scheduled time are thus fixed, however, the present time is indicated while being varied by the clock all the time and, therefore, setting of the scheduled time only may fulfill the purpose in the usual case. After the scheduled time, all operations including kneading through baking are automatically performed only with a the desired key among performance-mode keys 57 selectively depressed.

Performance mode of embodiment

The process of making bread using an apparatus of the abovesaid structure is as follows:

A description will be made mainly for the case in which bread materials are fed one day and baked into bread on the next morning with the aid of a timer switch.

First, wheat flour, butter, shortening, sugar, salt, and dry milk each in quantity corresponding to that of bread to be baked are put into the material vessel 2 and, with water added thereto, a lid 19 is put on the vessel 2. Yeast in quantity required for one series of operations to bake bread materials in the material vessel 2 is reserved in the yeast reserving box 21. In this case, yeast does not have to be wrapped by wafer and is reserved as it is.

Then, the scheduled time of completion of baking is set by manipulating the operation panel 17 and information about performance is stored in the control part 27 with a desired performance-key depressed. The operation requiring the user's hand comes to an end at this stage and automatic operations follow afterward. The first automatic process starts from the control part 27 which backwardly calculates the time of start of kneading from the scheduled time of completion of baking while taking the quantity of the material mixture and the atmospheric temperature into account, and stores calculation results in the memory. The control part 27 keeps the apparatus in stoppage until the set time.

Figure 8:
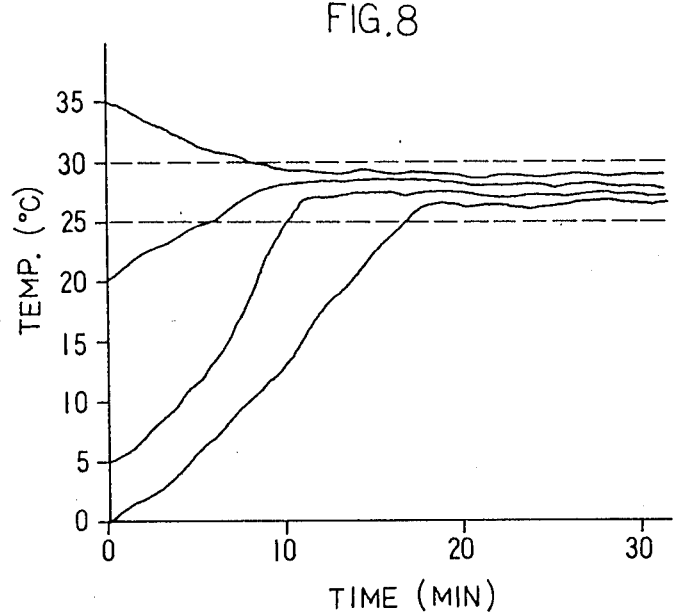
FIG. 8 is a graph showing variation in the dough temperature during kneading in the embodiment.

Upon arrival of the time of start of kneading, the early stage of kneading begins and the rotary vane 3 starts rotating. In the early kneading stage, the dough temperature is quickly raised or lowered so as to be close to the optimum kneading temperature, however, the manner of treating the temperature is various according to the season. For example, when the dough temperature is lower than the optimum kneading temperature in spring, autumn, and winter, not only the oven heater 8 but also a heater of the heater-equipped blower 9 is powered up when kneading starts so as to blow warm air. The dough temperature is immediately and quickly raised close to the optimum kneading temperature in a short period of time. The applicant of this invention observed variation in the degree of dough temperature with respect to time in the kneading process dependent on the above method and obtained such results as shown in FIG. 8. In this experiment, a material mixture in quantity corresponding to 1 lb (450 g) of baked bread was used for making a loaf of English bread. As shown in FIG. 8, the dough temperature, which was 0° C. at the start of kneading, could be raised close to the range between 27° and 30° C. as the optimum kneading temperature for English bread in a period of 15 minutes, and about 10 minutes for the temperature of 5° to 10° C.

On the other hand, when the temperature of the material mixture is as high as exceeding 27° C. at the start of kneading in summer, the oven heater 8 and the other heater 10 are not powered up and the fan of the heater-equipped blower 9 only is powered up to blow air of the normal temperature (called "cool air" hereinafter) onto the dough for quick lowering of the dough temperature. Cool air is comparable with the abovesaid warm air and varies in temperature according to the season, ranging from 20° to 30° C. in summer. Cool air blown onto the dough evaporates water from the dough and deprives the dough of evaporation heat to lower the dough temperature. The temperature fall in such case has empirically been found ranging roughly from 3° to 5° C. For example, at 33° C. of the atmospheric temperature, the lowered dough temperature ranges roughly from 28° to 30° C., in other words, the dough temperature can converge on the range of the optimum kneading temperature as from 27° to 30° C. Even when the atmospheric temperature is 35° C. or so in the mid-summer, the dough temperature can be lowered to converge on about 30° C. Since no other than only a few days are as hot as exceeding 35° C. in atmospheric temperature, it can be understood that lowering of the dough temperature close to the range between 27° and 30° C. is possible in almost all cases in summer. Fall of the dough temperature requires a period of about 10 minutes only and no more even at the atmospheric temperature of 35° C. as shown in FIG. 8. Thus, the dough temperature can apparently converge on the range between 27° and 30° C. in the lapse of 10 minutes or so as far as the atmospheric temperature is within the range from 5° to 35° C. Because of an atmospheric temperature variation lying within the range from about 5° to 35° C. throughout the season, as far as depending on a method according to this invention, is is possible to converge the dough temperature on the range between 27° and 30° C. in the lapse of a short time after the start of kneading regardless of the season.

Then, the later stage of kneading will be described. Incidentally, although the description is made on the two stages of kneading as early and later ones, both stages are termed for convenience by reference to curves indicating the dough temperature variation as shown in FIG. 8 and cannot be distinguished from each other so clearly, whereby it is to be noted that both stages are not separated definitely and either term is used merely for describing one step of the same continuous process of kneading. In the later stage, kneading must be conducted in a period of time necessary and sufficient for providing gluten of the optimum quality while monitoring the temperature ranging from 27° to 30° C. obtained in the early kneading stage. An entire length of time of about 30 minutes is ideal for kneading a material in quantity corresponding to 1 lb (450 g) of bread and, if longer or shorter, cannot provide dough of superior quality. As the early stage of kneading requires only about 10 minutes, the later stage is assured of a remaining time of about 20 minutes. This period of 20 minutes is as long as necessary and sufficient for yielding gluten of optimum quality.

The substantial mode of temperature control during the later kneading stage is as follows:

The dough temperature tends to rise during kneading due to frictional heat but is constantly monitored by the temperature sensor 13. When the dough temperature rises above the range between 27° and 30° C., the heater-equipped blower 9 blows cool air onto the dough whereas, when the temperature falls too low, warm air is blown so that the dough temperature may be converged constantly on the range between 27° and 30° C. by alternate or intermittent blowing of warm air and cool air. The state of such temperature control is also shown in FIG. 8.

As described above, the dough temperature is controlled to be close to the optimum kneading temperature in a short time after the start of kneading and kept at the same degree until completion of kneading, and, accordingly, bread materials are kneaded under the optimum condition without influence of the atmospheric temperature, whereby a time period of kneading is fixed on the basis of quantities of bread material alone irrespective of a temperature variation in the seasons.

In the above-described embodiment, the operation to raise the dough temperature is performed at the same time as that of starting kneading but, in winter, particularly, on an extremely cold day, pre-heating of the oven 7 before kneading is intended exceptionally. For example, it is feared that, when the atmospheric temperature is below 0° C., bread materials fed this day will have frozen before the start of kneading on the next morning if left as it is during the night. In preparation for such state as extreme temperature fall in the material mixture during the time before starting kneading, the preferable measures are to adapt the temperature sensor 13 to automatically sense the lowered temperature and to energize the oven heater 8 for a while to raise the temperature of the material mixture to a certain degree as an exceptional procedure.

The above description refers to the case using a timer switch, however, the start of kneading immediately after feeding of materials is also possible. The mode of operation in the latter case is entirely the same as that of the former case except for the early start of kneading.

Yeast is automatically poured into the material mixture by the yeast pouring device 28 during kneading and time setting for pouring is controlled by the temperature sensor 13 so that the temperature may be set at 27° C. for ensuring optimum raise and grain of bread. As the atmospheric temperature exceeds 27° C. in mid-summer, the time of yeast pouring may be immediately before or after kneading but must be considered as important when the atmospheric temperature is below 27° C. as in spring, autumn, and winter. For instance, in winter, about 10 minutes at the maximum are required for raising the dough temperature to the desired degree after starting kneading as described above, the dough temperature at the start of kneading being extremely lower than that at the completion of kneading. Generally, the degree of activity of yeast is greatly influenced by the ambient temperature and, when yeast is poured into the material vessel 2 at the start of kneading or together with bread materials, yeast is mixed with materials not yet fully warmed, whereby the degree of activity of yeast is lowered to badly affect the raise and grain of bread. The use of a yeast pouring device 28 in which the time of pouring is set according to the dough temperature enables pouring of yeast in the most suitable environment for proliferation of yeast fungi. Therefore, yeast fungi actively proliferate after being poured and expedite raising and graining of dough, thereby contributing to making of bread of superior quality. The temperature for yeast pouring is set at a fixed degree regardless of the season and loaves of bread in the stable state of fermentation can be obtained all the year round.

With the completion of kneading and of ripening of dough, the dough is subjected to primary fermentation, degassing, shaping-fermentation after the lapse of waiting time, and baking as the final step of bread making. In the process of baking, the dough is heated by warm air blown by the oven heater 7 and the heater-equipped blower 9 which are in joint operation. At this time, hot air changed from warm air by increasing the heat capacity of the heater 10 of the heater-equipped blower 9 may optionally be used.

The use of warm air blown jointly by the heater-equipped blower 9 and the oven heater 8 generates heat circulation instead of concentration of heat on a portion on account of the use of the oven heater 8 alone, thereby enabling uniform distribution of heat in the oven 7. As a result, loaves of bread having a uniformly baked surface without being scorched or unevenly baked can be obtained. Baking is performed at an oven temperature raised to about 220° C. The degree of temperature is monitored by the temperature sensor 15 internally fixed to the oven 7.

Temperature control in the inner part of bread during baking depends also on the temperature sensor 13 primarily used for temperature control in the kneading process. The temperature sensor 13 is internally disposed in the upper part of the revolving shaft 14 and the temperature of bread at a portion near the center thereof is exactly transmitted to the temperature sensor by virtue of the reduced thickness of the heat-resistant resin at the tip of the revolving shaft 14. Generally, the inner portion of bread is more impermeable to heat as it is nearer the core and the temperature at the core is the lowest even at the completion of baking, whereby control over the core temperature results in prevention of non-baked portion and ensures bread sufficiently baked throughout. In this embodiment, the core temperature is fixed at 100° C.

At the moment when the internal temperature of bread reaches 100° C., all operations are deemed completed and indicated by blinking of the lamp or sounding of the buzzer, when the oven heater 8 and the other heater 10 are turned off.

Since the process comes to an end at the approximate same time as the scheduled time set at first, the user of the apparatus can take out baked bread from the material vessel 2 and use it as food without delay after the scheduled time. However, the completion time of baking is slightly earlier than the scheduled time occasionally due to the water content of the dough. In such a case, it is necessary to take out bread from the material vessel 2 at once and cool it at the room temperature until mealtime so as to prevent degradation of bread quality. The reason for the necessity as above is that, if baked bread in close contact with the material vessel 2 is left therein, vapor generated in the internal portions of the bread, and tending to escape outwardly through the surface of the bread is intercepted by the inner wall of the material vessel 2 and collects into dew drops, whereby there occur problems that the bread surface is damped and wrinkled or baked bread loses stiffness and volume. In this embodiment, with a view to solving the above problems, degradation of the bread quality is intended to be prevented even if baked bread is left in the material vessel 2. In other words, the oven heater 8 and the other heater 10 are not actuated after baking but the fan of the heater-equipped blower 9 only is actuated to continuously blow suitable cool air onto the bread surface for constantly expelling vapor emitted from sticking to the inner wall of the material vessel 2.

For taking out baked bread, the lid 19 is opened and the material vessel 2 is turned by a certain degree of angle for disengagement of the edge 40 of the supporting stand 38 from the engaging part 41 of the setting stand 42, raised straight, and detached from the main body vessel 1. At this time, the rotary vane 3 is left buried in the bread contained in the material vessel 2. Then, bread is taken out from the material vessel 2, however, this operation is easy due to the coating of fluoric resin excellent in mold-releasability spread over the inner wall of the material vessel 2. The rotary vane 2 is left buried in the bread taken out, however, it can be pulled out easily due to its position near the bottom of the bread loaf and the leg part 33 thereof protruding from the bottom of the loaf so as to be pulled by hand, without spoiling the appearance of the bread loaf.

In this embodiment, shortening is fed into the material vessel 2 together with other materials at the same time, however, it has empirically been confirmed that the preferable way of providing gluten of superior quality is to feed shortening into the vessel during or after kneading. The reason for the above fact is that shortening as fat fed before or in the early stage of kneading envelops wheat flour and interferes with permeation of water into wheat flour. Accordingly, feeding of shortening in the stage or after completion of kneading is preferable. For satisfying such purposes, the additional provision of a shortening feeding mechanism (not shown) similar to the yeast pouring device 28 or provision of a device capable of feeding shortening and yeast at the same time and to be substituted for the yeast pouring device 28 shown in the drawing may be conceived.

As has hitherto been described, a bread-making apparatus of this invention is provided with a heater-equipped blower capable of suitable changeover between blowing warm air and cool water for selectively blowing warm air or cool air onto bread materials corresponding to the temperature of a bread material mixture at the time of starting kneading so as to obtain a dough temperature close to a temperature suitable for providing gluten of superior quality in a short period of time after starting kneading and, further, to maintain the dough temperature as it is until the completion of kneading by intermittent blowing of warm air or cool air, whereby the use of cold water in summer or warm water in winter is not required in contrast to the conventional practice and baking of bread free from the influence of temperature variation through all seasons by the use of water of normal temperature only is enabled without requiring human hands.

In the process of baking, the temperature distribution in the oven 7 is always kept uniform by warm air blown by the heater-equipped blower 9 and baked bread is free of burnt spot and unevenly baked portions. Further, temperature control during baking by means of the temperature sensor 13 inserted into the dough ensures bread which is well-baked even at the inner portion thereof and is full of flavor.

Furthermore, the yeast pouring device 28 is capable of pouring yeast at the dough temperature most suitable for proliferation of yeast fungi and complete elimination of unevenness in quality of bread which has conventionally been caused by indefinite temperature at the time of pouring yeast, thereby enabling constant provision of bread fully raised and grained.

Other embodiments

Various type of heater-equipped blowers may be devised.

It is possible to increase the heat capacity of the heater of the heater-equipped blower for enabling changeover between warm air and cool air in blowing as well as to use a motor capable of reverse rotation (not shown) for revolving a fan so as to blow hot air into the oven 7 and also suitably exhaust hot air outside the main body vessel 1. This method is particularly effective when quick raising of the dough temperature is required in cold weather as in winter. That is to say, hot air of, for example, 60° C. or above is blown onto the dough at the start of kneading once for raising the dough temperature to about 26° to 28° C. and then the heater of the heater-equipped blower is turned off together with the motor simultaneously rotated in the reverse direction for outwardly exhausting hot air in the oven 7 and finally adjusting the temperature in the oven 7 to be approximate to 27° to 30° C. Since the dough temperature is governed by the temperature in the oven 7, the abovesaid method enables quick heating-up of dough to a degree ranging from 27° to 30° C.

Figure 9:
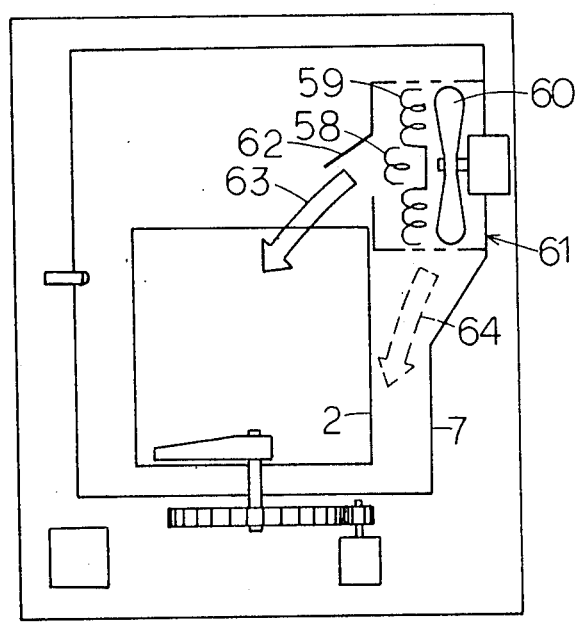
FIGS. 9 and 10 are views showing the concept of another embodiment of a heater-equipped blower.

As another embodiment, a structure as shown in FIG. 9 may be devised in such manner that a heater-equipped blower 61 composing a small capacity heater 58 for kneading and a large capacity one 59 for baking together fixed to the front part of the fan thereof is secured to the inner wall of the oven 7 above the material vessel 2. In this case, the small capacity heater 58 is disposed near the rotation center of the fan 60 whereas the large capacity one 59 on the periphery of rotation circle of the fan 60, and a guide plate 62 for regulating blowing direction is provided in advance of the fan 60 so that heaters are changed over when used for kneading, fermentation, and baking, respectively. The small capacity heater 58 is used for kneading, and warm air heater thereby is guided by the guide plate 62 to be blown principally to the dough. On the other hand, the large capacity heater 59 is used for fermentation and baking and hot air 64 heated thereby is blown into a gap between the inner wall of the oven 7 and the outer wall of the material vessel 2 to circulate within the oven 7 for even distribution of temperature therein so that the fermentation temperature may be, for example, 32° C. for obtaining the optimum fermentation condition and the baking temperature may be 200° C. for baking bread without causing uneven baking. Since heating for baking depends on hot air only, an oven heater 8 to be fixed to the outer side of the material vessel is not required.

Figure 10:
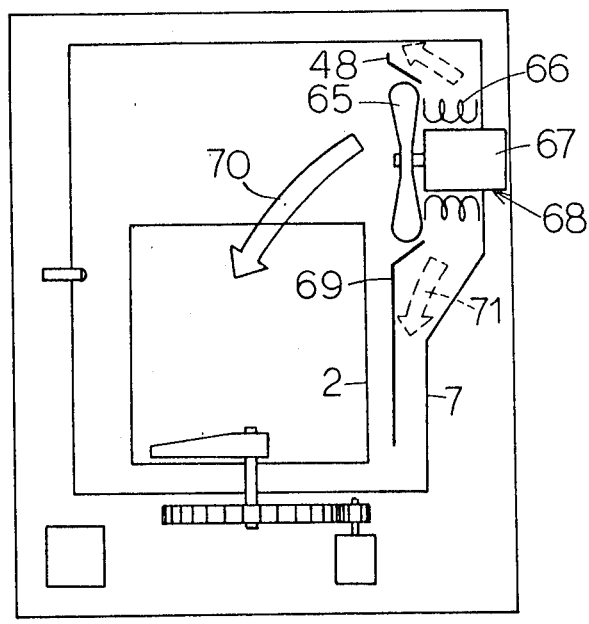

Further, it may be devised, as shown in FIG. 10, to arrange only one set of a large capacity heater 66 adjustable in heat capacity in the rear of the fan 65 and a motor 67 capable of reverse rotation to be used for driving the fan 65 so as to compose a heater-equipped blower 68 and fixed to the inner wall of the oven 7. In this arrangement, shield plates 48 and 69 are provided between air current to flow into the heater-equipped blower 68 and hot air current blown out therefrom for definitely dividing the flow passage. During kneading, heat capacity of the large capacity heater 66 is reduced to blow warm air onto bread materials whereas, during baking, output of the heater 66 is increased and the fan 65 is revolved in the reverse direction to suck air present in advance thereof so as to heat sucked air by the large capacity heater 66 and blow hot air 71 to the rear of the fan 65, whereby hot air 71 is guided to the lower part of the outer wall of the material vessel 2 to heat the vessel 2 from the side of the outer wall and the bottom thereof. In this way, the surface of the material mixture appearing on the upper part of the material vessel 2 is prevented from direct exposure to hot air 71 and is free from the risk that the position subjected to blowing of hot air is excessively heated to be severely scorched. After baking, the fan 65 is driven in the ordinary direction again and heat capacity of the large capacity heater 66 is reduced to blow moderate hot air to the dough surface, when evaporation of water content of the dough at the inner portion thereof is expedited and, as a result, the dampening of the bread surface in contact with the inner wall of the material vessel 2 never occurs.

Mode of yeast pouring device

Another embodiment of the yeast pouring device is shown in the drawing explanatory of concept of the device.

Figure 11:
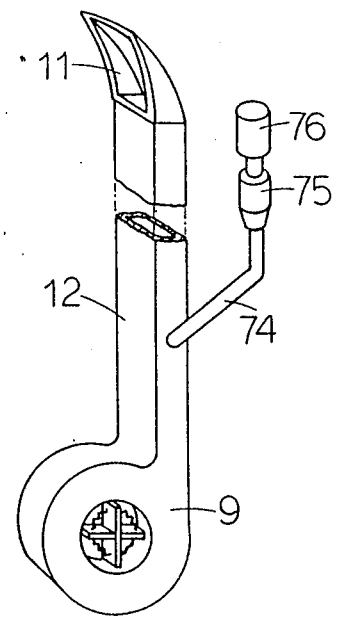
FIG. 11 and FIGS. 12(a) and -(b) are views of yeast pouring devices as other embodiments of this invention; and, FIG. 13 is a view of a material vessel and rotary vane as another embodiment.

For example, as shown in FIG. 11, devisable is a structure in which one end of a feed pipe 74 is fixed to an appropriate midpoint of a duct 12 connected to the heater-equipped blower 9 and the other end is fixed to a yeast reserving box 76 through an electromagnetic valve 75. In this structure, yeast is blown into the material vessel 2 together with air through a blow port 11 and scattered over a relatively wide surface area of the material mixture, thereby enabling an even mixture of yeast and bread materials.

Figure 12:
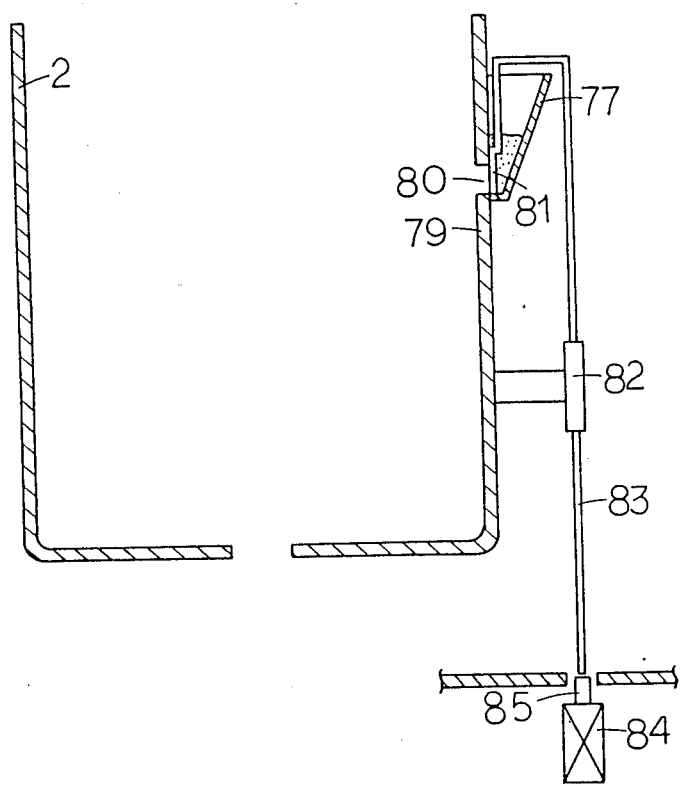
Figure 12:
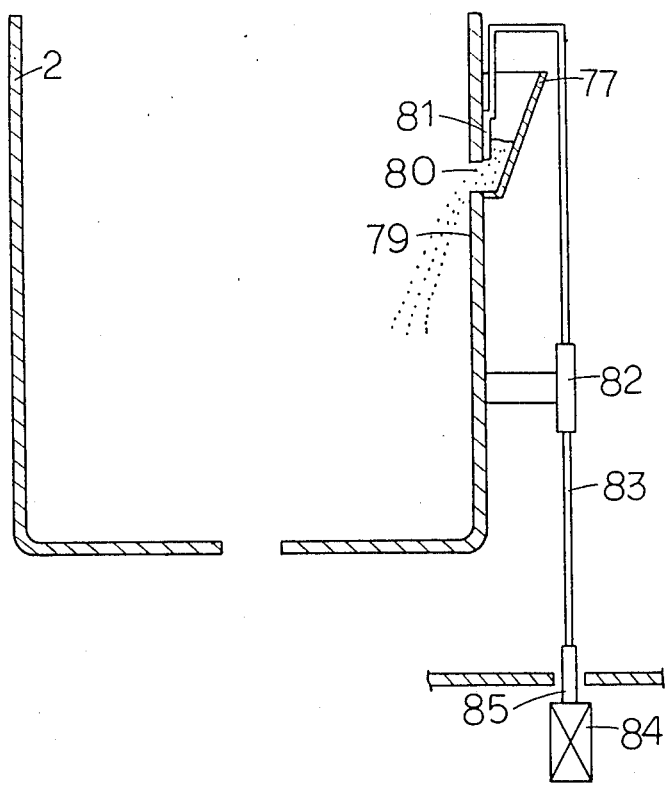

Also, devisable is, as shown in FIG. 12, a structure in which a yeast reserving box 77 having a reserving space reduced toward the lower part thereof is fixed to an upper part of the outer wall 79 of the material vessel 2 and a pouring port 80 for pouring yeast is drilled on the above-said outer wall 79 in such a way as for suitable opening and closing of the pouring port 80. This opening/closing mechanism is of a structure in which a lever 83 is provided in a position aside the material vessel 2 so as to be vertically slidably supported by a supporting pipe 82 and bent at the upper end side to have a valve 81 fixed thereto. A plunger pump 84 is disposed below the lever 83 so that yeast can be poured into the material vessel 2 through the pouring port 80 when the valve 81 is upwardly moved by the lever 83 pushed upward by uprise of the driving lever 85.

Further, devisable is that the motor in use as a driving source of the heater-equipped blower is additionally used as a substitute for the motor 6 as a driving source of the rotary vane 3. Such a device enables the use of a single set of motor, reduction in size of the apparatus, and saving of production cost of the apparatus.

Other embodiments of material vessels and rotary vanes

A material vessel 2 and rotary vane may be constructed into a structure as shown in FIG. 13. A hole 87 diametrally larger than the outer diameter of the revolving shaft 14 is drilled on the center of the bottom 86 of the material vessel 2 and an upright part 88 projecting toward the interior of the material vessel 2 is provided on the periphery of the hole 87 whereas an outer cylindrical part 89 and inner one 90 are provided on the side of the rotary vane 3 for loosely fitting the upright part into a gap therebetween. Such structure of the material vessel 2, even if water is poured earlier than feeding of bread materials thereinto, prevents water flowing outside through the hole 87 and provides an advantage in easy handling of the apparatus.

I claim:

1. An apparatus for making bread comprising:
    an oven provided with oven heating means;
    a vessel internally disposed in said oven for receiving bread materials;
    kneading means comprising a rotary vane internally disposed at the bottom of said vessel;
    a temperature sensor disposed inside said vessel;
    a heater-equipped blower capable of switching between blowing warm air or cool air, said heater-equipped blower being provided with means for conducting air blown by the heater-equipped blower to said vessel; and
    a control unit for controlling the performance, in a sequential order, of a kneading step wherein the bread materials are kneaded into a dough, a fermentation step in which the kneaded dough is fermented, and a baking step in which the fermented dough is baked, wherein said control unit comprises means for setting a predetermined duration for the kneading step, means for comparing the temperature detected by said temperature sensor to a predetermined optimal kneading temperature, and means for activating said heat-equipped blower to blow cool air into said vessel if the detected temperature is higher than the optimal kneading temperature, and to blow warm air into said vessel if the detected temperature is lower than the optimal kneading temperature, and means for terminating the kneading step at the end of the preset duration for the kneading step.

2. An apparatus for making bread as set forth in claim 1, wherein the rotary vane is rotatably fitted on a revolving shaft.

3. An apparatus for making bread as set forth in claim 2, wherein the top part of the revolving shaft is hollow and is made of heat-resistant resin and the tip of said shaft is reduced in thickness and said temperature sensor is internally disposed therein.

4. An apparatus for making bread as set forth in claim 3, wherein the rotary vane is provided with a leg part of such length as to protrude from the bottom surface of a loaf of bread taken out from the vessel.

5. An apparaus for making bread as set forth in any one of claims 1, 2, 3, or 4, wherein a heater-equipped blower capable of changing over the directions of blowing from a positive one to a negative one and vice verse is used.

6. An apparatus for making bread comprising:
    an oven provided with oven heating means;
    a vessel internally disposed in said oven for receiving bread materials;
    kneading means comprising a rotary vane internally disposed at the bottom of said vessel;
    a temperature sensor disposed inside said vessel;
    a heater-equipped blower capable of switching between blowing warm air or cool air, said heater-equipped blower being provided with means for conducting air blown by the heater-equipped blower to said vessel;
    a yeast pouring device comprising a yeast reserving box and means for conducting yeast from said yeast reserving box to said vessel;
    a control unit for controlling the performance, in a sequential order, of a kneading step wherein the bread materials are kneaded into a dough, a yeast-pouring step in which yeast is poured into the vessel and kneaded with the dough, a fermentation step in which the kneaded dough is fermented, and a baking step in which the fermented dough is baked, wherein said control unit comprises means for setting a predetermined duration for the kneading step, means for comparing the temperature detected by said temperature sensor to a predetermined yeast-pouring temperature, means for activating the pouring yeast pouring device to pour yeast into said vessel when the detected temperature reaches the predetermined yeast-pouring temperature, means for comparing the temperature detected by said temperature sensor to a predetermined optimal kneading temperature, and means for activating said heat-equipped blower to blow cool air into said vessel if the detected temperature is higher than the optimal kneading temperature, and to blow warm air into said vessel if the detected temperature is lower than the optimal kneading temperature, and means for terminating the kneading step at the end of the preset duration for the kneading step.

7. An apparatus for making bread as set forth in claim 6, wherein the predetermined yeast-pouring temperature is 27° C.

8. An apparatus for making bread as set forth in claim 7, wherein the yeast-pouring device is disposed above the vessel and comprises a yeast reserving box and an electromagnetic valve disposed below said yeast reserving box.

9. An apparatus for making bread as set forth in claim 7, wherein the yeast pouring device comprises a yeast reserving box connected, by way of an electromagnetic valve, to an appropriate midpoint of a duct connected to the heater-equipped blower.

10. An apparatus for making bread as set forth in claim 7, wherein the yeast pouring device comprises a yeast reserving box fixed to the outer wall of the vessel and having a yeast pouring port drilled on said outer wall, and a mechanism for opening and closing said yeast pouring port.

* * * * *